United States Patent [19]

Liabenow et al.

[11] Patent Number: 4,830,746
[45] Date of Patent: May 16, 1989

[54] DEVICE FOR SEPARATING SOLIDS AND INTERMIXED LIQUIDS FROM INDUSTRIAL WASTE

[75] Inventors: Kenneth H. Liabenow, Livonia, Mich.; Allen Rechtzigel, Inver Grove, Minn.; Dennis Springer, Belleville, Mich.

[73] Assignee: K & D Industries, Inc., Romulus, Mich.

[21] Appl. No.: 191,151

[22] Filed: May 6, 1988

[51] Int. Cl.[4] .............................................. B01D 33/06
[52] U.S. Cl. .................... 210/202; 210/319; 210/297; 210/402
[58] Field of Search .............................. 210/201–203, 210/297, 314, 318, 319, 402, 499

[56] References Cited

U.S. PATENT DOCUMENTS

| | | | |
|---|---|---|---|
| 3,769,204 | 10/1973 | Kincannon | 210/201 |
| 3,790,476 | 2/1974 | Spoerle | 210/47 |
| 3,956,116 | 5/1976 | Brandt | 210/42 |
| 4,093,542 | 6/1978 | Dahmen et al. | 210/54 |
| 4,268,382 | 5/1981 | Hanke et al. | 210/499 |
| 4,303,532 | 12/1981 | Smelley et al. | 210/732 |
| 4,330,450 | 5/1982 | Lipowski et al. | 524/547 |
| 4,358,381 | 11/1982 | Takeuchi et al. | 210/202 |
| 4,537,685 | 8/1985 | Kennedy et al. | 210/709 |

FOREIGN PATENT DOCUMENTS

| | | | |
|---|---|---|---|
| 250879 | 12/1966 | Austria | 210/402 |
| 2802960 | 7/1978 | Fed. Rep. of Germany | 210/202 |
| 2424053 | 11/1979 | France | 210/402 |

Primary Examiner—Bernard Nozick
Attorney, Agent, or Firm—Gifford, Groh, Sheridah, Sprinkle and Dolgorukov

[57] ABSTRACT

An apparatus for continuously separating intermixed solids and liquids from industrial waste. The device includes an elongated conduit having an inlet and outlet and where the interior of the conduit forms a mixing chamber. The industrial waste is pumped into the inlet of the mixing chamber and a polyelectrolyte compound is introduced into the mixing chamber at at least two spaced locations along the conduit. The outlet of the conduit is then passed across both a stationary screen and then into a rotating drum separator, which, together, remove the water from the waste material.

4 Claims, 2 Drawing Sheets

DEVICE FOR SEPARATING SOLIDS AND INTERMIXED LIQUIDS FROM INDUSTRIAL WASTE

BACKGROUND OF THE INVENTION

1. Field of the Invention

The present invention relates to a device for separating intermixed solids and liquids from industrial waste.

2. Description of the Prior Art

There are a number of previously known methods of disposing of industrial waste. In one previous method, the industrial waste in liquid form is pumped into porous rock formations which are surrounded by nonporous rock formations so that the liquid is retained within the porous rock. One disadvantage of this method, however, is that the liquid must be truly liquid, thus containing little or no particulate matter which would act to block the pores within the rock formation. Thus, a relatively great amount of liquid is required to dispose of a relatively small amount of solid waste material.

A more common method of disposing of industrial waste is by depositing the waste in a landfill. In a landfill, a pit is formed and a liner, typically constructed of clay or a synthetic material such as plastic, is placed within the pit in order to retain all of the material disposed within the pit. In order to prevent contamination of the land in the event of a tear or break in the liner, only solid material may be disposed within the landfills. Consequently, it is required to separate and solidify all solids from the industrial waste.

One technique for preparing the industrial waste containing liquid components for disposal in a landfill is to mix the liquid absorbing compound with a material such as Portland cement which absorbs the liquid and renders the material safely disposable in the landfill as a solid. The greater the liquid components of the waste, the more Portland cement or the like is required to solidify the waste.

One disadvantage of this previously known method of solidifying the industrial waste is the cost of the liquid absorbing compound, such as Portland cement. Furthermore, the addition of the solidifying compound, such as Portland cement, frequently increases both the volume and the weight of the resulting solidified waste.

A still further previously known method for disposing of industrial waste is described in U.S. Pat. No. 4,537,685 to Kennedy III et al., issued Aug. 27, 1985. That patent discloses a method for separating a mixture containing both solid and liquid phases of industrial waste. In brief, a polyelectrolyte compound is introduced into the waste matter in such proportions as to overflocculate the solids contained within the waste material. The over-flocculated waste coalesces into globules of masses which are then separated from the remaining liquid phase. The separation of the overflocculated mass from the liquid is then achieved by a vibrating screen mesh and the solid waste is then dried and disposed of.

One disadvantage of the device disclosed in the Kennedy patent, however, is that the flow rate of treatment of the waste material is relatively low. Furthermore, this previously known device utilizes complex mixing apparatus in order to mix the polyelectrolyte with the waste material thereby increasing both the cost and complexity of the overall system.

SUMMARY OF THE PRESENT INVENTION

The present invention provides a device for continuously separating into mixed solids and liquid phase components from waste which overcomes all of the above mentioned disadvantages of the previously known devices.

In brief, the present invention comprises an elongated conduit which forms a mixing chamber having an inlet and an outlet. A pump pumps the waste material into the inlet end so that the waste material flows through the conduit and exits from its outlet.

A polyelectrolyte compound is introduced to the waste material at two or more spaced locations along the conduit and thus, at two or more spaced locations along the mixing chamber. This provision thus enables careful control of the amount of the polyelectrolyte compound which is added to the waste material.

A housing forming an outlet chamber is positioned at the outlet end of the conduit. This housing includes a dam along one side over which the waste material flows as it is pumped into the outlet chamber. Furthermore, an air sparge continuously bubbles air into the bottom of the outlet chamber thus maintaining the fluidity of the flocculated waste material. The air sparge also enhances the intermixing of the polyelectrolyte within the waste material to assure overflocculation.

A stationary screen receives the flocculated waste as it passes over the dam and simultaneously separates a portion of the water from the flocculated waste material so that the waste material exiting from the stationary screen is semisolid.

The semisolid waste material is then sent into one end of a rotating drum which completes the separation of water from the waste material. The now solid waste material is expelled from the other end of the rotating drum and, after a brief drying period, is transported to the landfill for disposal.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF THE PRESENT INVENTION

Figure 1:
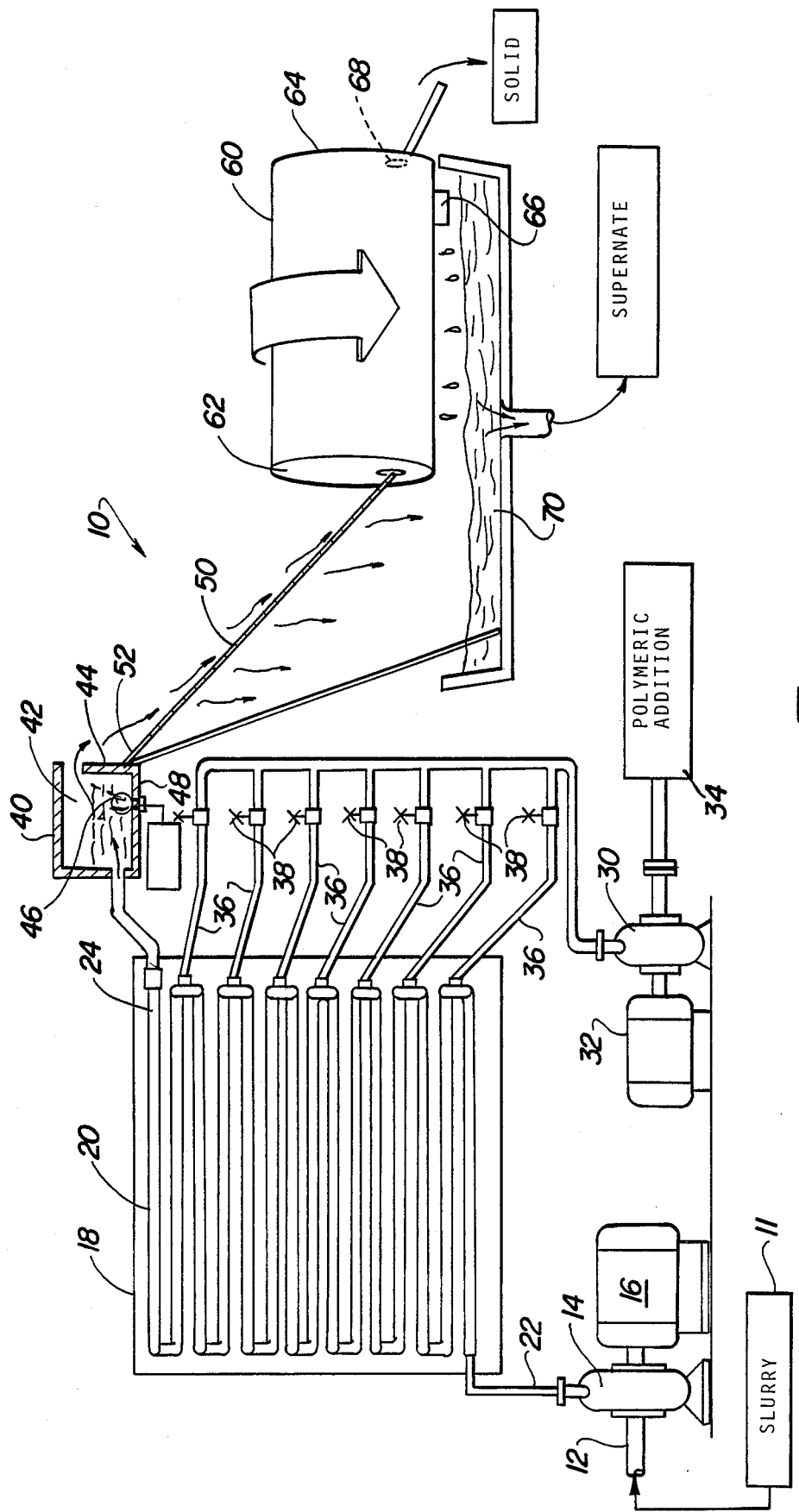
FIG. 1 is a diagrammatic view illustrating the preferred embodiment of the present invention.

With reference first to FIG. 1, a diagrammatic view of the preferred embodiment 10 of the present invention is thereshown for removing solids and intermixed liquids from a source 11 of industrial waste. The industrial waste is fed to an inlet pipe 12 of a pump 14. The pump 14 is driven by a motor 16 which continuously pumps the waste from the source 11 to a mixing chamber 18.

Figure 2:
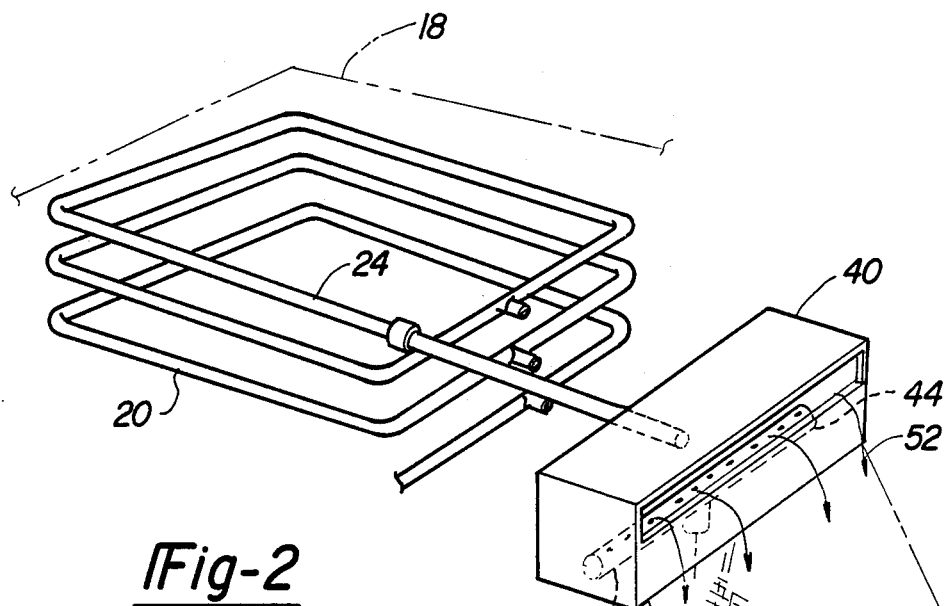
FIG. 2 is a diagrammatic view illustrating a portion of the components of the preferred embodiment of the present invention.

With reference now to FIGS. 1 and 2, the mixing chamber 18 is thereshown in greater detail and comprises an elongated conduit 20 having an inlet 22 and an outlet 24. The actual configuration of the conduit 20 is not critical. However, in the preferred form of the invention, the conduit 20 is arranged in a coil having a generally rectangular crossectional shape (see FIG. 2). This configuration thus minimizes the amount of physical area required for the mixing chamber 18.

The actual size of the conduit 20 used to form the mixing chamber 18 will, of course, vary upon the particular application. For example, in a full size industrial waste separator, the conduit 20 is three inches in diameter while the mixing chamber is rectangular, ten feet per side, and has ten layers in the coil.

Still referring to FIG. 1, a pump 30 driven by a motor 32 pumps a polyelectrolyte compound from a source 34 into the mixing chamber 18 in a fashion to be shortly described. The polyelectrolyte is preferably a long chain, high molecular weight polymer or compound and preferably a high molecular weight polymer emulsion.

The polymer may be one of three types reflecting the state of the electrical charge, i.e. either cationic, anionic or nonanionic. As is well known, the polymer is chosen in response to the charge of the solids within the industrial waste and, in practice, the correct polymer is determined by empirical experimentation upon samples taken from the waste source 11.

Although there are a number of polyelectrolytes which are suitable to overflocculate the solids, two polymers which have been found to be particularly suitable for usage in many applications are long chain polyacrylamides such as those sold under the brand names Tretolite TF,L 362 and Tretolite TF,L 381 manufactured by Tretolite Corporation in St. Louis, Mo.

Referring now to FIGS. 1 and 2, the outlet from the pump 30 is fluidly connected by a plurality of branch pipes 36 to the conduit 20 and thus to the mixing chamber 18. Furthermore, the branch pipes 36 are fluidly connected to the conduit 20 at at least two spaced locations along the conduit 20 and preferably at a plurality of different spaced locations along the conduit 20. Each branch pipe also includes a valve 38 so that the particular branch pipes 36 can be selectively fluidly disconnected from the outlet of the pump 30.

The provision of using a plurality of branch pipes 36 connected through valves 38 to the outlet from the pump 30 enables both the amount of polyelectrolyte and the position at which the polyelectrolyte compound is introduced into the mixing chamber 18 to be carefully controlled. This ensures complete overflocculation of the waste material.

Still referring to FIGS. 1 and 2, the outlet 24 from the mixing chamber is fluidly connected to a generally rectangular housing 40 which defines a generally rectangular outlet chamber 42 having a dam 44 formed along one side. Pressurized air is introduced through an air sparge 46 at the bottom 48 of the housing 40. This pressurized air thus maintains the fluidity of the now flocculated waste material by maintaining suspension of the flocculated waste in the liquid components. Any conventional air sparge 46 can be employed.

Figure 3:
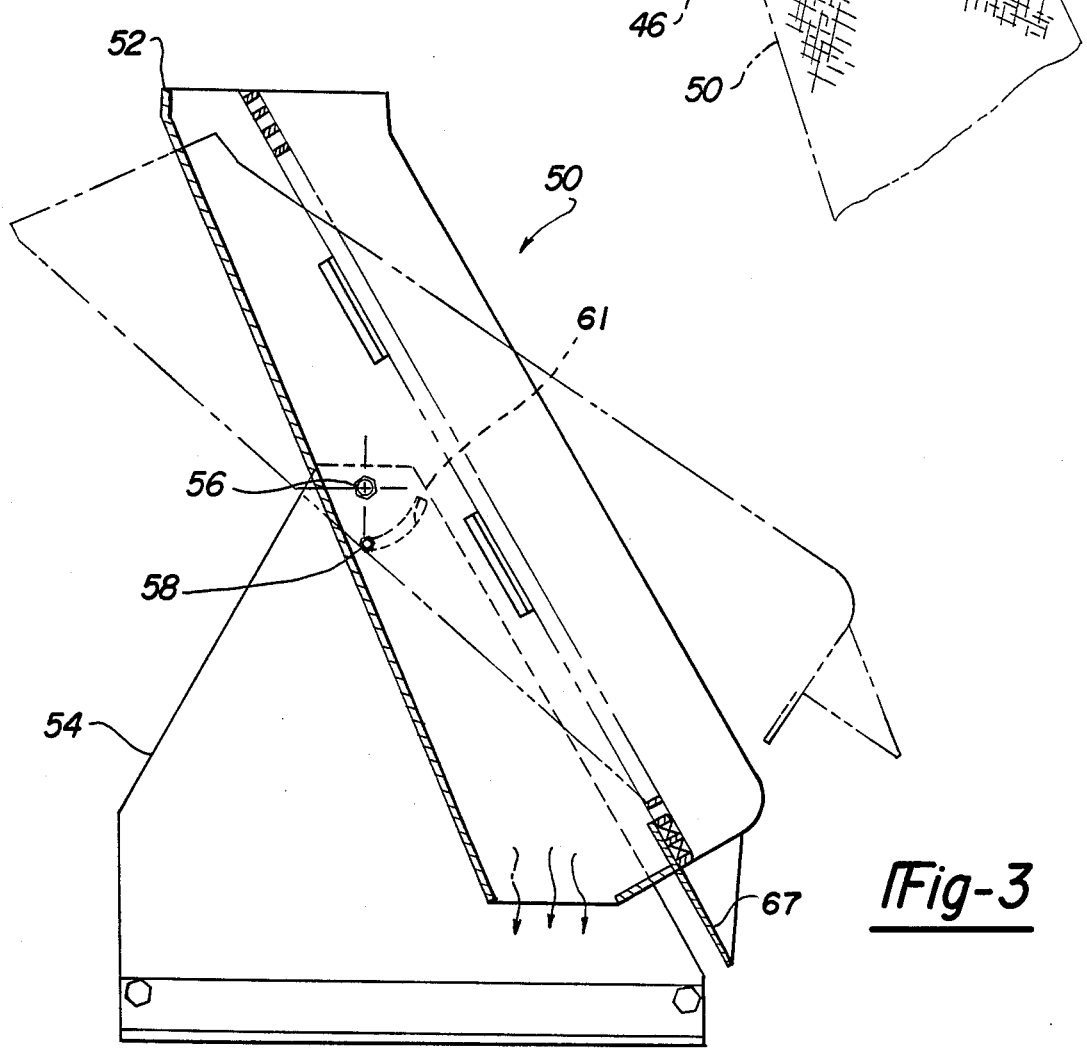
FIG. 3 is a view illustrating still a further component of the preferred embodiment of the present invention.

Referring now to FIGS. 1 and 3, a stationary screen 50 is provided adjacent the housing 40 and receives the flocculated waste and liquid components of the material as they flow over the dam 44. The screen 50 is inclined with respect to the horizontal so that its upper end 52 is adjacent the dam 44.

As best shown in FIG. 3, preferably the screen 50 is generally rectangular in shape and each side of the screen 50 is pivotally secured to an upstanding side support 54 by a pivot pin 56. A lock nut 58 extends in between the screen 50 and an arcuate slot 61 formed in the side support 54 so that the angle of inclination of the screen 50 is adjustable within the limits of the arcuate slot 61.

Referring again to FIG. 1, the device of the present invention includes a rotating drum separator 60 having an inlet axial end 62 and an outlet axial end 64. A chute 67 (FIG. 3) at the lower end of the screen 50 delivers waste into the inlet end 62 of the rotating drum 60. The rotating drum 60 is rotatably driven by any conventional motor 66 and has a mesh exterior. Thus, as the drum 60 is rotated, liquid is expelled through the outer periphery of the rotating drum 60 so that solid waste 68 is expelled from its outlet end 64. A liquid reservoir 70, furthermore, is positioned both beneath the rotating drum 60 as well as the screen 50 which collects liquid as it is separated from the flocculated solids by either the stationary screen or rotating drum 60. This liquid preferably is returned to the source 11 of the waste material.

In operation, the waste material is pumped by the pump 14 from the waste reservoir 11, thorugh the conduit 20 and then to the outlet chamber 42. As the liquid waste passes through the conduit 20, however, the polyelectrolyte compound is introduced to the waste material, thus overflocculating the waste material in the previously described fashion.

In the outlet chamber 42, the air sparge 46 maintains the fluidity of the flocculated waste material by preventing the overflocculated waste material from coalescing and forming oversized globs of material.

The waste material together with the liquid is then pumped over the dam 44 and across the stationary screen 50. A portion of the liquid is separated from the mixture by the screen 50 and this liquid is collected in the reservoir 70. The material, furthermore, naturally flows from the upper end 52 into the lower end of the stationary screen 50, due to gravity, into the inlet end 62 of the rotating drum separator 60.

The rotating drum 60 further separates liquid from the flocculated solids, and this liquid is also collected within the reservoir 70. Consequently, damp solid material 68 is expelled from the outlet end 64 of the rotating drum 60. This waste material 68, after a brief drying period, typically less than a few days, completely dries and is transported to a landfill for disposal.

From the foregoing, it can be seen that the present invention provides a simple and yet totally effective means for removing solids from industrial waste for disposal in a landfill or the like.

Having described our invention, however, many modifications thereto will become apparent to those skilled in the art to which it pertains without deviation from the spirit of the invention as defined by the scope of the appended claims.

We claim:

1. A device for continuously separating intermixed solids and liquid phase components of waste comprising:

a mixing chamber, having an inlet and an outlet, means for pumping the waste to the inlet of said mixing chamber, means for introducing a polyelectrolyte compound into said mixing chamber, means for receiving material from the outlet of said mixing chamber and for separating solids from liquids, wherein said mixing chamber comprises an elongated conduit, wherein said introducing means comprises means for introducing said compound into said mixing chamber at two spaced apart locations along said conduit, wherein said receiving means comprises a rotating drum filter having two open ends, said chamber outlet being open to one end of said filter, and a stationary screen interposed between said outlet and said drum filter.

2. The invention as defined in claim 1 and comprising a housing defining an outlet chamber interposed in series between the outlet from the mixing chamber and said first end of said screen, said housing having a dam adjacent said one end of said screen, and means for introducing air into a bottom of said housing.

3. The invention as defined in claim 1 wherein said screen is inclined with respect to the horizontal, said screen having an upper end and a lower end, said mixing chamber outlet being open to the upper end of said screen and said lower end of said screen being open to said one end of said drum filter.

4. The invention as defined in claim 3 and comprising means for varying the angle of inclination of said screen with respect to the horizontal.

* * * * *